E. K. BAKER.
WHEEL RIM FOR PNEUMATIC TIRES.
APPLICATION FILED JULY 27, 1906.
1,053,347.
Patented Feb. 18, 1913.
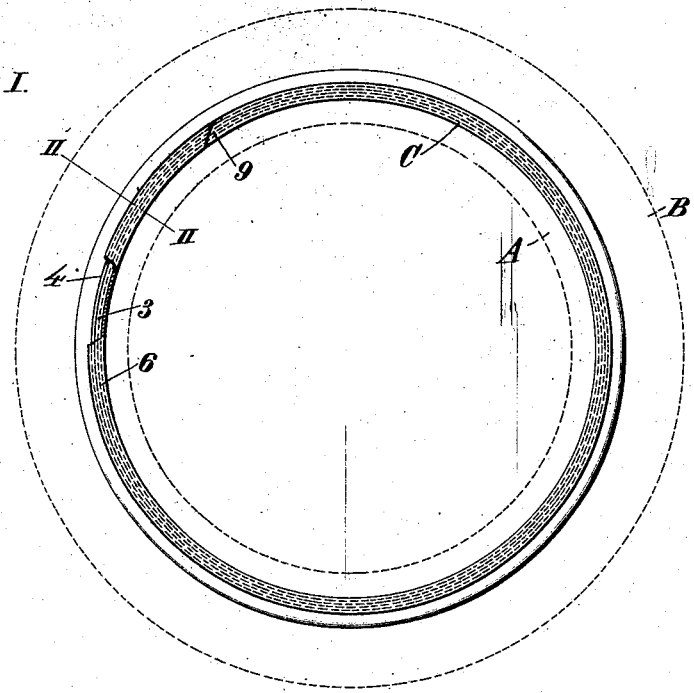
Fig. I.
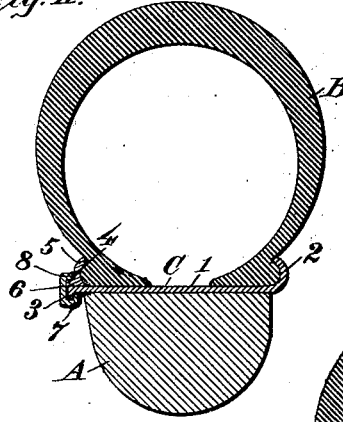
Fig. II.
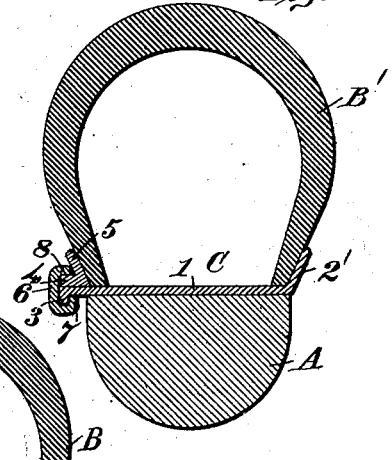
Fig. III.
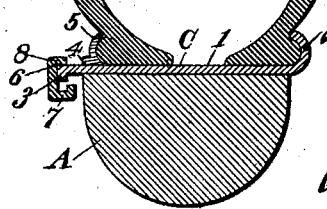
Fig. IV.
Witnesses;
H. S. Austin
Chas. F. Murray
Inventor,
Erle K. Baker
by
Atty.

UNITED STATES PATENT OFFICE.

ERLE K. BAKER, OF CHICAGO, ILLINOIS, ASSIGNOR, BY DIRECT AND MESNE ASSIGNMENTS, TO UNIVERSAL RIM COMPANY, A CORPORATION OF ILLINOIS.

WHEEL-RIM FOR PNEUMATIC TIRES.

1,053,347.

Specification of Letters Patent. Patented Feb. 18, 1913.

Application filed July 27, 1906. Serial No. 328,051.

*To all whom it may concern:*

Be it known that I, ERLE K. BAKER, a citizen of the United States, and a resident of Chicago, Cook county, Illinois, have invented certain new and useful Improvements in Wheel-Rims for Pneumatic Tires, of which the following is a full, clear, and exact description, such as will enable others skilled in the art to which it appertains to make and use the same.

My invention relates to wheels having pneumatic tires and has special reference to improvements in the rims of such wheels.

The object of my invention is to provide an improved wheel rim adapted to receive and hold a tire such as a pneumatic automobile tire and which rim shall be so constructed that the tire may be easily and quickly placed upon or removed therefrom.

A further and particular object of the invention is to provide an improved wheel rim that shall have an adjustable or removable flange, so constructed, and composed of such parts, that the pressure of the tire against the flange shall be a factor in the positive fastening and locking of said detachable or removable flange upon the rim.

Other objects of my invention will appear hereinafter.

The invention consists generally in a wheel rim, comprising a rim proper having a locking flange at its edge, in combination with a split or open locking ring for engagement with said flange, and an endless tire holding flange-ring which conforms to the base of a tire said flange ring serving to hold said locking ring and itself held thereby.

My invention also consists in various details of construction and in combinations or parts, all as hereinafter described and particularly pointed out in the claims.

The invention will be more readily understood by reference to the accompanying drawings, forming a part of this specification, and in which—

Figure 1 is a side view of a wheel rim embodying my invention, the felly of the wheel and the pneumatic tire being shown in dotted lines; Fig. 2 is an enlarged cross section of the felly, rim and tire, showing a rim that is adapted for use with a clencher tire; Fig. 3 illustrates the invention as it appears in use with a non-clencher or U-shaped tire; and Fig. 4 is a sectional detail like unto Fig. 2, showing the manner of removing the flange locking ring.

As shown in the drawings, A, represents the wheel felly. The rim, C, is applied to the felly and the tire, B—B', is held in the rim. The flanges of the rim conform to the shape of the base of the tire. Two different forms are shown in Figs. 2 and 3 and it will be noted that the rim flanges are respectively curved and straight. (See 2—2'). In making these rims, I prefer that only the outer flange shall be detachable; the inner flange, 2—2', may be integral with the body of the rim C.

Except for the difference in shape resulting from the form of the tire, the structures of Figs. 2 and 3 are identical. The part 5—5 Figs. 2 and 3 respectively is an endless ring loosely fitted to the rim, C, and the ring is provided with an outwardly projecting annular flange, 4, which I term the locking flange of the detachable ring. The rim has an inwardly turned flange, 3. This is engaged by the locking ring, 6, the arrangement being such that the flange, 4, of ring, 5, serves to hold the ring, 6, in engagement with the rim flange, 3. The ring, 6, is cut, opened or split at a point, 9, and may be expanded or contracted as required to force it into engagement with or withdraw it from the flange, 3. As shown, the ring, 6, has an inner flange, 7, which locks against the inner side of the flange, 3, and said ring also has a flange, 8, beneath which the flange, 4, of ring, 5, is driven by the pressure of the expanded tire. The manner of applying a tire to this rim is as follows: The ring, 5, is first pushed inwardly to free the ring, 6. The latter is then contracted sufficiently to disengage it from the rim flange, 3. Thereupon the ring, 5, may be removed from the rim; and the tire, even though it snugly fits the rim, may be easily pushed onto the rim. The tire is followed by the ring, 5. The locking ring, 6, is thereupon sprung in place upon the flange, 3, the ring, 5, being meantime forced back out of the way. When the locking ring has been seated properly, the ring, 5, may be thrown back far enough to engage the outer flange 8, on the ring, 6, and will be forced home when the tire is expanded.

Various modifications of my invention will readily suggest themselves to one skilled in the art and I therefore do not confine the invention to the specific constructions herein shown and described.

Having thus described my invention, I claim as new and desire to secure by Letters Patent:

1. A wheel rim having a tread or tire supporting part, with means along one edge for preventing the escape of a tire, and having along the other edge an inward-turned flange extending continuously around said edge, in combination with an elastic grooved ring provided with a lateral flange on its outer edge and engaging by outward expansion with the flange on said rim, and a tire-retaining flange provided with a rib adapted to enter the space between said lateral flange and the rim and to be held in place thereby and to hold said ring in locked condition on the rim, substantially as described.

2. The combination with a rim having an outer surface to receive a tire of an endless tire retaining flange or ring fitted to said surface and provided with a lateral rib and a one piece, diagonal split expansible locking ring engaging with the edge of the rim and having its outer edge inturned to form a continuous shoulder which engages the rib on said endless ring to retain said ring against lateral movement, said locking ring being adapted to be expanded and locked upon the rim by outward movement of said ring, substantially as described.

3. A pneumatic tire retaining rim comprising a main tire supporting rim having a tire retaining flange at one edge and an inwardly turned continuous flange at the opposite edge, an endless tire retaining ring telescopically fitting said main rim and having an outwardly projecting flange at its inner edge, and a split ring of substantially U-shaped cross section adapted to overlap the flanged edge of the main rim and the flange of the endless ring and provided with an outwardly turned flange at its inner side edge adapted to interlock with the inwardly turned flange of the main rim when said split ring is sprung into place, and thereby retain the two rings interlocked with the rim, substantially as described.

In testimony whereof, I have hereunto set my hand, this 16th day of July, 1906, in the presence of two subscribing witnesses.

ERLE K. BAKER.

Witnesses:
A. W. NELSON,
F. G. KNIGHT.

---

Copies of this patent may be obtained for five cents each, by addressing the "Commissioner of Patents, Washington, D. C."